(12) United States Patent
Fraczkiewicz et al.

(10) Patent No.: US 10,501,831 B2
(45) Date of Patent: Dec. 10, 2019

(54) METHOD FOR PRODUCING AN ALLOY FOR A REFORMING TUBE

(71) Applicant: L'Air Liquide, SociétéAnonyme pour l'Etude et l'Exploitation des Procédés Georges Claude, Paris (FR)

(72) Inventors: Anna Fraczkiewicz, Saint Etienne (FR); Karolina Maminska, Saint Etienne (FR); Pascal Del-Gallo, Dourdan (FR); Jader Furtado, Andresy (FR); Daniel Gary, Montigny-le-Bretonneux (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 222 days.

(21) Appl. No.: 15/517,405

(22) PCT Filed: Sep. 16, 2015

(86) PCT No.: PCT/FR2015/052483
§ 371 (c)(1),
(2) Date: Apr. 6, 2017

(87) PCT Pub. No.: WO2016/055710
PCT Pub. Date: Apr. 14, 2016

(65) Prior Publication Data
US 2017/0298484 A1    Oct. 19, 2017

(30) Foreign Application Priority Data

Oct. 8, 2014  (FR) .................................. 14 59653

(51) Int. Cl.
*C22C 38/40*     (2006.01)
*C21D 6/00*      (2006.01)
(Continued)

(52) U.S. Cl.
CPC .............. *C22C 38/40* (2013.01); *C21D 6/004* (2013.01); *C21D 6/02* (2013.01); *C21D 9/08* (2013.01);
(Continued)

(58) Field of Classification Search
CPC ........ C21D 2211/001; C21D 2211/004; C21D 6/004; C21D 6/02; C21D 9/08;
(Continued)

(56) References Cited

U.S. PATENT DOCUMENTS

2005/0178477 A1* 8/2005 Igarashi ................ C22C 38/001
                                                        148/325
2005/0178478 A1* 8/2005 Igarashi .................. C22C 38/58
                                                        148/325
(Continued)

FOREIGN PATENT DOCUMENTS

WO  WO-2016005724 A1 * 1/2016 ............. C22C 30/00

OTHER PUBLICATIONS

International Search Report for PCT/FR2015/052483, dated Jan. 15, 2016 (machine translation).
(Continued)

*Primary Examiner* — Veronica F Faison
(74) *Attorney, Agent, or Firm* — Elwood L. Haynes

(57) ABSTRACT

The invention relates to a microstructure of an alloy for a tube for reformers, having an austenitic matrix structure, characterised in that: i) primary micrometric precipitates in the form of $M_{23}C_6$-type carbides, where M=Fe, Ni or Cr, and/or M(C,N)-type carbides, where M==Nb or Ti, are formed during the solidification of the alloy; ii) secondary nanometric precipitates in the form of $M_{23}C_6$-type carbides, where M=Fe, Ni or Cr and/or M(C,N)-type carbides, where M==Nb or Ti, are formed during the activation of the tube;
(Continued)

and iii) between 0.1 and 0.3% of $Ni_{16}Si7Nb_6$-type intermetallic precipitates is formed during the use of the tube.

7 Claims, 10 Drawing Sheets

(51) Int. Cl.
    *C21D 6/02*     (2006.01)
    *C21D 9/08*     (2006.01)
    *C22C 38/44*     (2006.01)
    *C22C 38/46*     (2006.01)
    *C22C 38/48*     (2006.01)
    *C22C 38/50*     (2006.01)
    *C22C 38/02*     (2006.01)
    *C22C 38/04*     (2006.01)

(52) U.S. Cl.
    CPC .............. *C22C 38/02* (2013.01); *C22C 38/04* (2013.01); *C22C 38/44* (2013.01); *C22C 38/46* (2013.01); *C22C 38/48* (2013.01); *C22C 38/50* (2013.01); *C21D 2211/001* (2013.01); *C21D 2211/004* (2013.01)

(58) Field of Classification Search
    CPC ......... C22C 38/00; C22C 38/40; C22C 38/44; C22C 38/46; C22C 38/48; C22C 38/50
    See application file for complete search history.

(56) References Cited

U.S. PATENT DOCUMENTS

| | | | |
|---|---|---|---|
| 2006/0193743 A1* | 8/2006 | Semba | C22C 38/001 420/53 |
| 2007/0034302 A1* | 2/2007 | Takahashi | B01J 19/02 148/327 |
| 2016/0167009 A1* | 6/2016 | Chun | C22C 30/00 252/373 |
| 2017/0130301 A1* | 5/2017 | Flahaut | C22C 30/00 |
| 2017/0306463 A1* | 10/2017 | Flahaut | B22D 13/02 |
| 2017/0321310 A1* | 11/2017 | Hatano | C21D 1/76 |

OTHER PUBLICATIONS

Barbabela, G.C. et al., "Phase characterization in two centrifugally cast HK stainless steel tubes," Materials Characterization, Elsevier, New York, NY, US, vol. 26, No. 1, Jan. 1, 1991, 1-7.

Sourmail, T., "Precipitation in creep resistant austenitic stainless steels," Materials Science and Technology, Jan. 2001, vol. 17, 1-14.

Thomas, C.W. et al., "Microstructure and properties of alloy HP50-Nb: comparison of as cast and service exposed materials," Materials Science and Technology, May 1996, vol. 12, 469-475.

Xu, N. et al., "High temperature corrosion of cast heat resisting steels in CO+CO2 gas mixtures," Corrosion Science 50 (2008) 2398-2406.

International Search Report for PCT/FR2015/052483, dated Jan. 15, 2016.

* cited by examiner

METHOD FOR PRODUCING AN ALLOY FOR A REFORMING TUBE

CROSS REFERENCE TO RELATED APPLICATIONS

This application is a 371 of International PCT Application No. PCT/FR2015/052483 filed Sep. 16, 2015, which claims priority to French Patent Application No. 1459653 filed Oct. 8, 2014, the entire contents of which are incorporated herein by reference.

BACKGROUND

The present invention relates to microstructures of iron, nickel and chromium alloys which are stable, in particular under conditions of high temperatures (900-1050° C.) and/or of high pressures (10-40 bar), to the alloys comprising these microstructures, to the process for the manufacture of these alloys and to the reforming tubes comprising these alloys.

Alloys of this type can be used in the manufacture of reforming tubes for the production of synthesis gas (a mixture of $H_2$ and CO), but also in the manufacture of furnaces, for example heat treatment furnaces. Reforming tubes are filled with catalyst consisting of nickel supported on alumina. The decomposition reaction of methane is endothermic and requires an external heat source, which is generally installed inside a combustion chamber equipped with burners. These operating conditions impose two main requirements on the reforming tubes, namely the tubes have to be resistant to high-temperature oxidation and, most importantly, to deformation by creep. Currently, plants use standard tubes or the microstructure is not controlled or stabilized despite the severe temperature and pressure conditions.

Under these severe conditions, the alloy can rapidly age, which will result in premature fracturing and thus in loss of production of the synthesis gas often combined with fines paid by the client for the uninterrupted provision of hydrogen and carbon monoxide.

In other words, the alloys of the reforming tubes exhibit a limited creep strength if they are exposed to temperatures of greater than 900° C.

The microstructure of the alloy is very complex and its constituents appear at different scales, as demonstrated in FIG. 1. On the macroscopic level, the grains of this type of alloy are sometimes of columnar and equiaxed type or of columnar type only but of millimetric size. On the microscopic level, a network of primary carbides is found at the limits of the dendritic cells. Due to the instability of the initial microstructure in service, a fine secondary precipitation takes place in the eutectic cell which is an austenitic matrix. Taking into account the working conditions, two creep mechanisms may be involved: diffusion creep and dislocation creep. The microstructural optimization consists in controlling the precipitation process during service since fine secondary precipitates act as a barrier to the movement of dislocations and in this way promoting a slowing down in phenomenon of deformation by creep.

The typical microstructure of these alloys in the rough state is an austenitic matrix comprising primary intergranular precipitates having a eutectic structure, such as chromium carbides of $M_7C_3$ (M=Fe, Ni, Cr) or $M_{23}C_6$ (M=Fe, Ni, Cr) type and niobium and titanium carbides of MCN (M=Nb, Ti) type.

Starting from that, one problem which is posed is that of providing an alloy exhibiting a better microstructure making it possible to better withstand high temperatures and pressures.

SUMMARY

A solution of the present invention is a microstructure of an alloy for a tube for reformers exhibiting an austenitic matrix, characterized in that:

i) micrometric primary precipitates in the form of carbides of $M_{23}C_6$ type with M=Fe, Ni or Cr and/or of M(C,N) type with M=Nb or Ti are formed during the solidification of the alloy;

ii) nanometric secondary precipitates in the form of carbides of $M_{23}C_6$ type with M=Fe, Ni or Cr and of M(C,N) type with M=Nb or Ti are formed during the bringing into service of the tube; and iii) an amount of intermetallic precipitates of $Ni_{16}Si_7Nb_6$ type of between 0.1 and 0.3% is formed during the use of the tube.

It should be noted that the G ($Ni_{16}Si_7Nb_6$) phase is regarded as harmful as it causes a deterioration in the mechanical creep strength at temperatures of reforming processes.

As the case may be, the microstructure according to the invention can exhibit one or more of the following characteristics:

- the secondary precipitates form dislocation clusters. In this way, they are dispersed in the austenitic matrix.
- the primary precipitates are micrometric.
- the secondary precipitates are nanometric.
- the secondary precipitates are between 5 nm and 50 nm, preferably between 10 nm and 20 nm.
- the primary precipitates of $M_{23}C_6$ type represents from 3 to 8% of the chemical composition of the alloy and the M(C,N) precipitates represents from 0.5 to 2.5% of the chemical composition of the alloy.
- the secondary precipitates of $M_{23}C_6$ type represents from 1 to 3% of the chemical composition of the alloy and the M(C,N) precipitates represents from 0.1 to 0.5% of the chemical composition of the alloy.

The characteristics of the precipitates present in the microstructure according to the invention are shown in table 1 below:

TABLE 1

Characteristics of the alloy microstructure of this invention

| Characteristics | Primary precipitate | Secondary precipitate |
| --- | --- | --- |
| Morphology | noncontinuous | noncontinuous |
| Distribution | delimits the eutectic cell | in the eutectic or intradendritic cell |
| Chemistry | $M_7C_3$ (M=Fe, Ni, Cr) $M_{23}C_6$ (M=Fe, Ni, Cr) M(C, N) (M=Nb, Ti) | $M_{23}C_6$ (M=Fe, Ni, Cr) M(C, N) (M=Nb, Ti) |
| Size | μm | nm |
| Amount (as a function of the alloy chemical composition) | $M_{23}C_6$: 4 to 8% M(C, N): 1 to 3% | $M_{23}C_6$: 1 to 3% M(C, N): 0.1 to 0.5% |

Another subject matter of the present invention is an alloy of iron, of nickel and of chromium exhibiting a microstructure according to the invention, comprising from 22 to 30% by weight of Cr, from 20 to 45% by weight of Ni and from 0.3 to 0.6% by weight of C. Preferably, the alloy according to the invention will comprise the contents of the chemical elements as shown in table 2 below.

TABLE 2

Chemical composition of the targeted alloys (as % by weight)

| Chemical element | Operational range | Preferable range | More preferable range |
|---|---|---|---|
| C | 0.3 to 0.6 | 0.38 to 0.55 | 0.43 |
| Ni | 20 to 45 | 30 to 38 | 35 |
| Cr | 22 to 30 | 23 to 28 | 25 |
| Mn | 0.5 to 1.2 | 0.6 to 1.0 | 0.7 |
| Si | 0.5 to 1.1 | 0.7 to 0.9 | 0.8 |
| Nb | 0.5 to 1.5 | 0.7 to 1.3 | 1.0 |
| Ti | 0.05 to 0.7 | 0.1 to 0.7 | 0.3 |
| W | 0.05 to 0.5 | 0.1 to 0.3 | 0.2 |
| Mo | 0.05 to 0.5 | 0.1 to 0.3 | 0.2 |
| V | 0.05 to 0.3 | 0.05 to 0.2 | 0.1 |

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
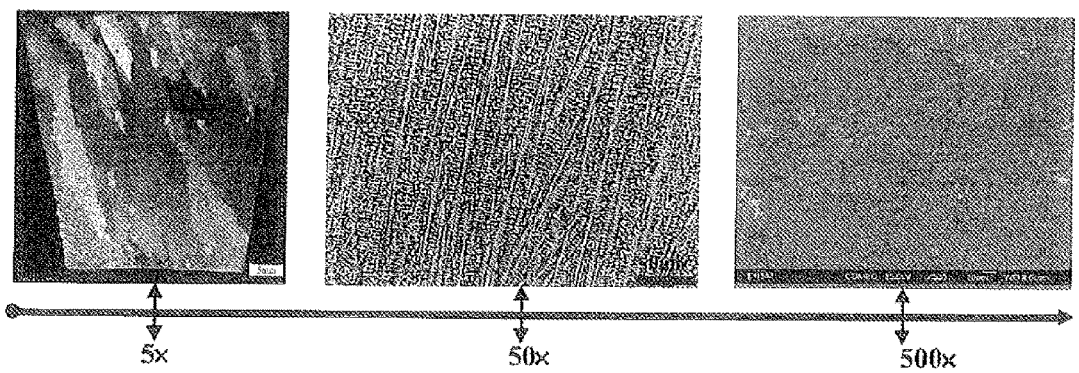
FIG. 1 illustrates the typical microstructure of an alloy, as known to the art.
Figure 2:
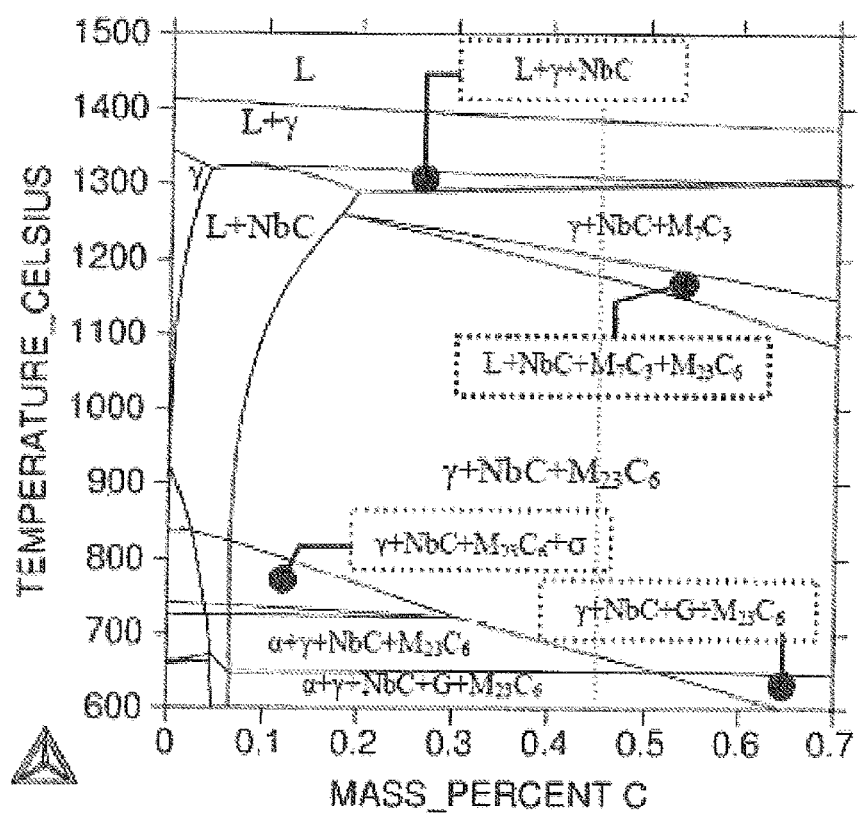
FIG. 2 illustrates a phase diagram of an alloy, in accordance with one embodiment of the present invention.

The present invention gives, as example of alloy corresponding to the characteristics of the present invention, an alloy C with a carbon content of 0.45% by weight (table 3). FIG. 2 corresponds to the equilibrium phase diagram of this alloy C. The alloy C is stable above 670° C. in crystallographic configuration of the austenitic phase and unstable below the temperature at which it is in configuration of ferrite type. During the cooling of the alloy C, the precipitates of the following carbides are observed: NbC and the chromium carbides $M_7C_3$ and $M_{23}C_6$. The phase G, a silicide with the stoichiometry of $Ni_{16}Si_7Nb_6$, is stable only at a temperature of less than 650° C. The phase G is regarded as harmful; it causes a deterioration in the mechanical strength at temperatures of reforming processes.

Figure 3:
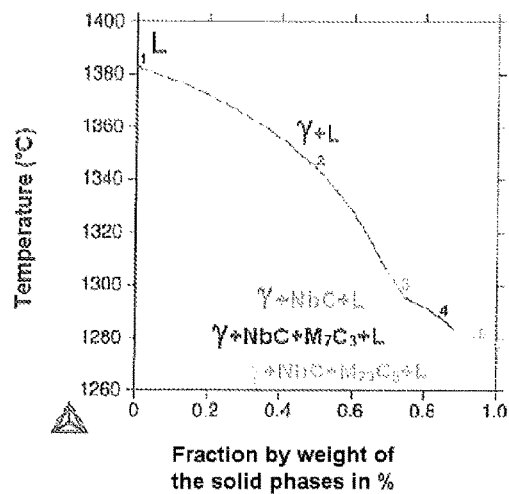
FIG. 3 illustrates the kinetics of solidification of the alloy C according to the Scheil-Gulliver method are represented, in accordance with one embodiment of the present invention.

In FIG. 3, the kinetics of solidification of the alloy C according to the Scheil-Gulliver method are represented. The precipitation of NbC takes place first of all, followed by the chromium carbides. This prediction has been confirmed by metallographic observations of samples of the alloy C.

Figure 4A:
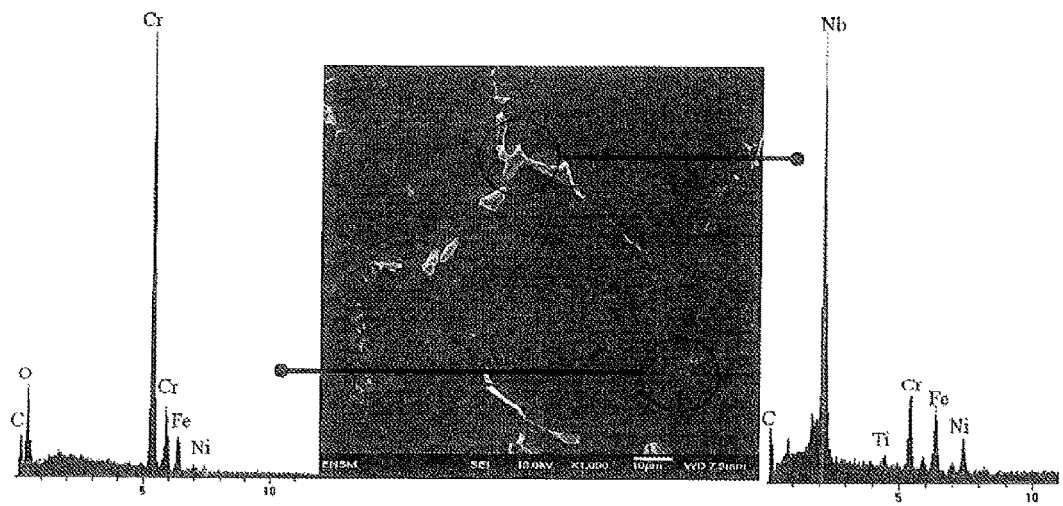
FIG. 4A illustrates microscopic observations confirming the presence of two primary carbides in the initial microstructure of the alloy C, in accordance with one embodiment of the present invention.
Figure 4B:
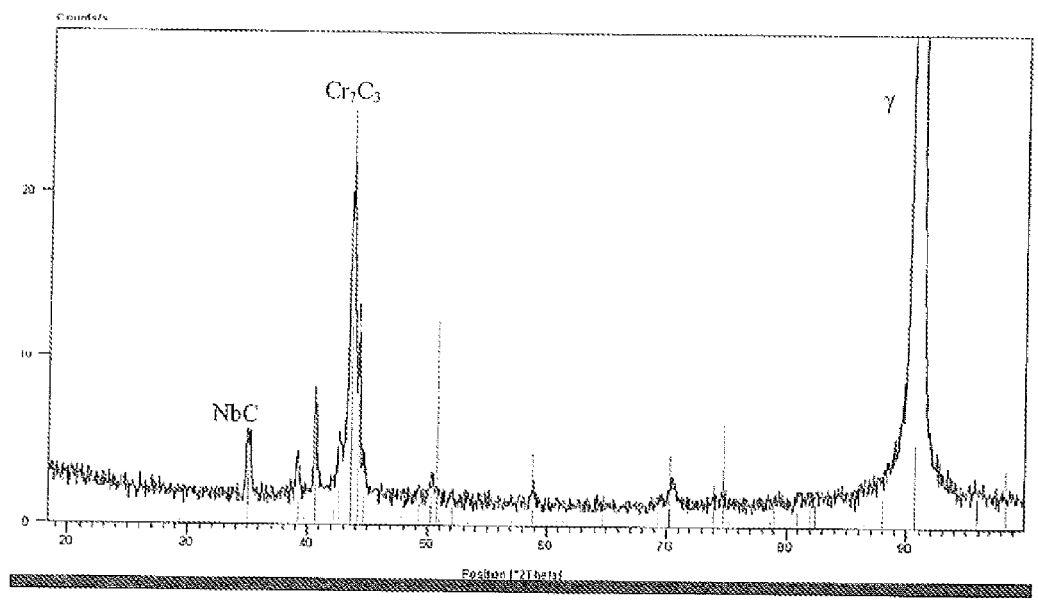
FIG. 4B illustrates microscopic observations confirming the presence of two primary carbides in the initial microstructure of the alloy C, in accordance with one embodiment of the present invention.

Microscopic observations confirm the presence of two primary carbides in the initial microstructure of the alloy C (FIGS. 4A and 4B). X-ray diffraction on a bulk sample and on a powder formed of residues (obtained by electrolytic dissolution of the matrix) demonstrates that the microstructure of the alloy in the cast state consists of austenite, NbC and $M_7C_3$. Furthermore, an analysis of the carbides by EBSD (electron backscatter diffraction) confirms that the chromium carbides are of $M_7C_3$ type.

Figure 5:
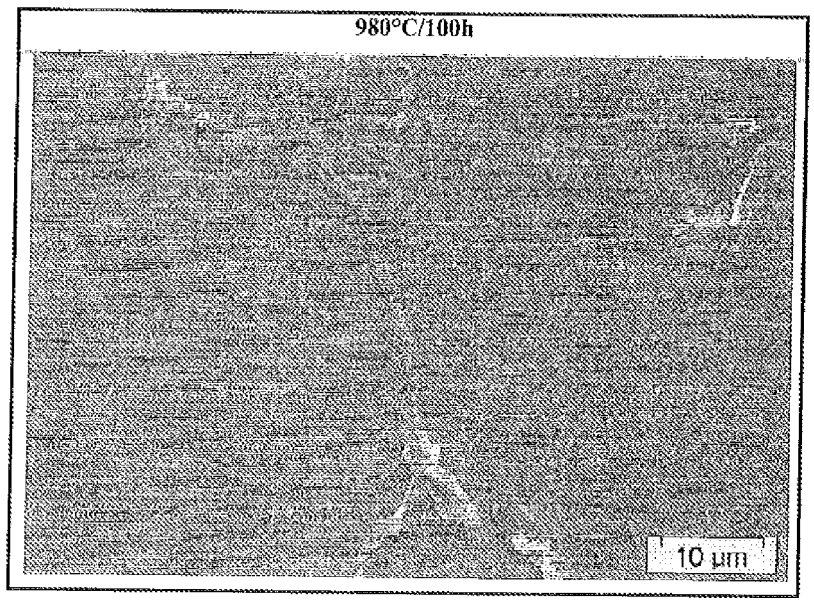
FIG. 5 illustrates a fine secondary precipitation is observed in dendritic cells, in accordance with one embodiment of the present invention.

As the rate of solidification during the manufacture of tubes is high, the expected microstructure exhibits only primary carbides rich in Cr of $M_7C_3$ type and primary carbides rich in Nb of MC type which delineate the eutectic cells in the austenitic matrix. No secondary carbide was observed at this scale of observation in the austenitic matrix or next to the primary carbides. To date, these alloys are not heat treated in order to stabilize the microstructure during the introduction into service of the final product. It is only during service at 980° C. that the carbides of $M_7C_3$ type can be transformed into $M_{23}C_6$, the only stable chromium carbide below 1170° C. (FIG. 2, phase diagram). As this transformation releases the carbon (the $M_7C_3$ contains more of it than the $M_{23}C_6$), at the same time, a fine secondary precipitation is observed in dendritic cells (FIG. 5).

Figure 6:
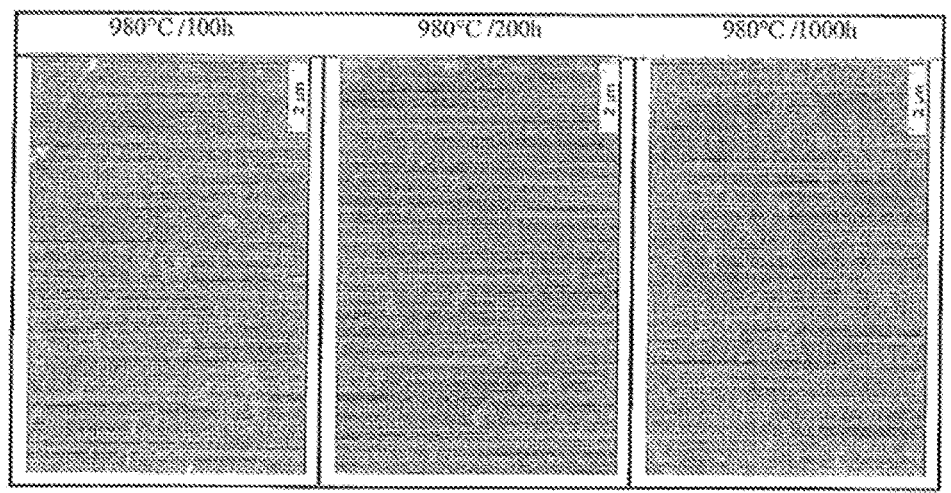
FIG. 6 illustrates that the mean size of the precipitates virtually does not change over time, in accordance with one embodiment of the present invention.

The microscopic observations of the states aged at 980° C. demonstrate that, at this temperature, the secondary precipitation of the $M_{23}C_6$ takes place very rapidly. The mean size of the precipitates virtually does not change over time (FIG. 6) and, after 100, 200 and 1000 hours of aging, the precipitates have an average size of 350 nm. The result of this is that, after relatively short periods of aging, the secondary precipitation begins to undergo the coalescence which decreases the creep strength of the alloy. In the current state of the art, these alloys are subjected to agings during their in-service use without any monitoring, such as the completion of the nucleation and of the growth of the precipitates by accident.

In order to reduce effects of the coalescence, it is necessary to modify the microstructure by increasing the number of nuclei by carrying out a heat pretreatment. It concerns a microstructural modification before the entry into service of the alloy. The concept of a pretreatment is presented diagrammatically in FIGS. 7A and 7B. As the nucleation stage is decisive, it is a matter of creating solid nuclei during a pretreatment which will only be obliged to grow during service.

Figure 8A:
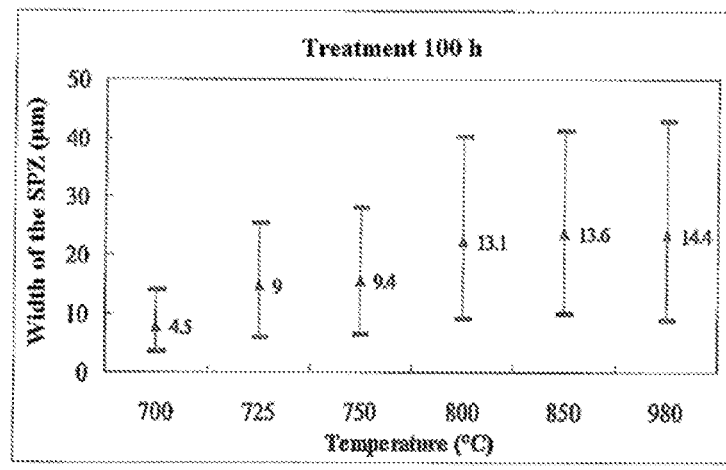
FIGS. 8A and 8B illustrate the two criteria that have been taken in choosing conditions of a pretreatment, in accordance with one embodiment of the present invention.
Figure 8B:
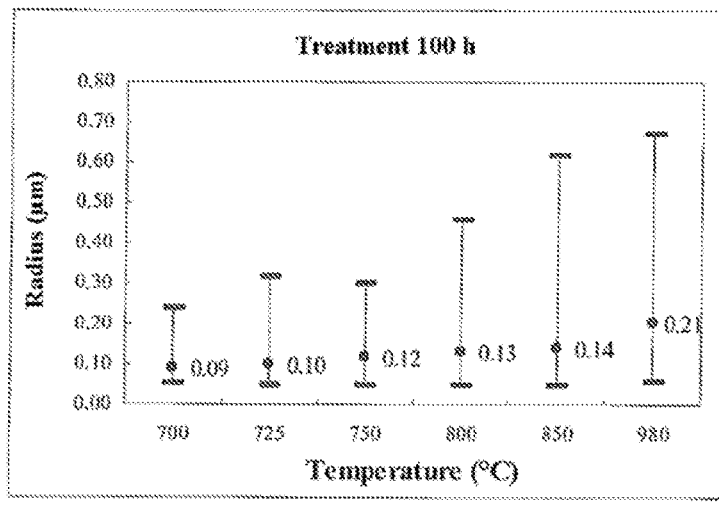

Two criteria have been taken in choosing conditions of a pretreatment: the size of precipitates, which has to be low, and the width of the secondary precipitation zone, which has to be high (FIGS. 8A and 8B).

Figure 7A:
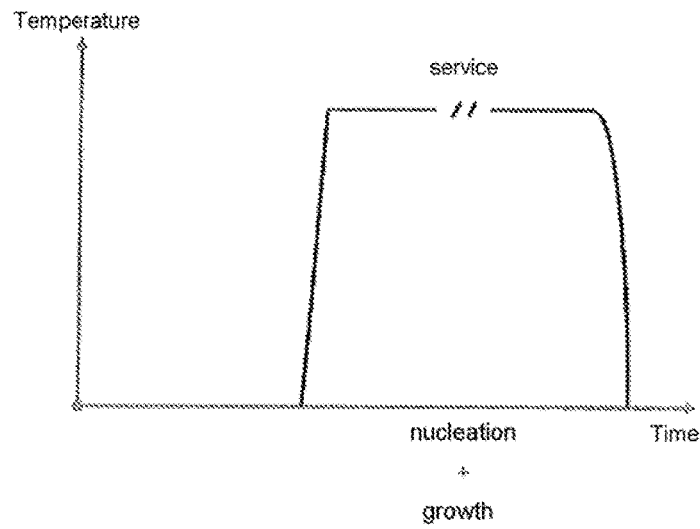
FIGS. 7A and 7B illustrate the concept of a pretreatment, in accordance with one embodiment of the present invention.
Figure 7B:
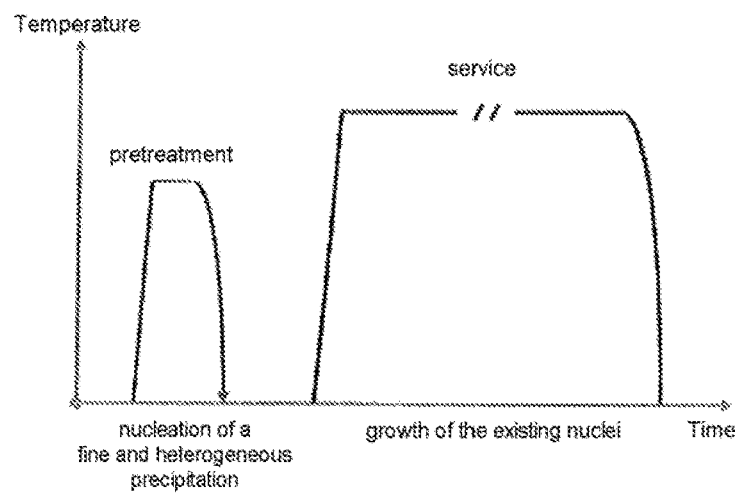

The present invention thus provides for the separation of these two phenomena with a pretreatment carried out in ranges of temperatures which are lower than the temperature used in service, as is shown diagrammatically by FIGS. 7A and 7B, and for the completion of the precipitation once the alloy is introduced into service.

Another subject matter of the present invention is a process for the manufacture of an alloy according to the invention, characterized in that said process comprises a heat treatment of an alloy of iron, nickel and chromium comprising from 22 to 30% by weight of Cr, from 20 to 45% by weight of Ni and from 0.3 to 0.6% by weight of C by exposure of this said alloy to a temperature of between 700° C. and 1000° C. with a stationary phase of 10 hours to 1000 hours.

Preferably, the heat treatment is carried out in two stages:
a) a first stage of heat treatment at temperatures between 700° C. and 800° C. with a stationary phase of 10 h to 100 h, and
b) a second stage of heat treatment under operating conditions of the furnace of the reforming having as source a source of hydrocarbons and being subjected to a pressure varying between 1 and 4 MPa and a temperature between 900° C. and 1000° C.

This is because it is a matter of setting the conditions of the heat treatment which will make it possible to stabilize the microstructure with a fine precipitation of the secondary carbides rich in Cr of $M_{23}C_6$ type (M=Fe, Ni, Cr) and of other carbides rich in Nb of MC type (M=Nb, Ti).

Figure 9:
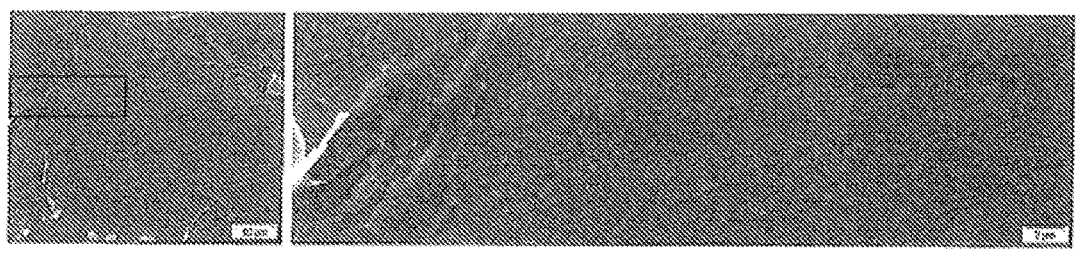
FIG. 9 illustrates that after a short aging, the secondary precipitation zone is limited and it is observed only close to former primary chromium carbides, in accordance with one embodiment of the present invention.

During the heat treatment, further to the transformation of the primary carbides, the carbon is sent toward the center of cells and a fine secondary precipitation is observed therein. However, after short agings, the secondary precipitation zone is limited and it is observed only close to former primary chromium carbides (FIG. 9).

Figure 10:
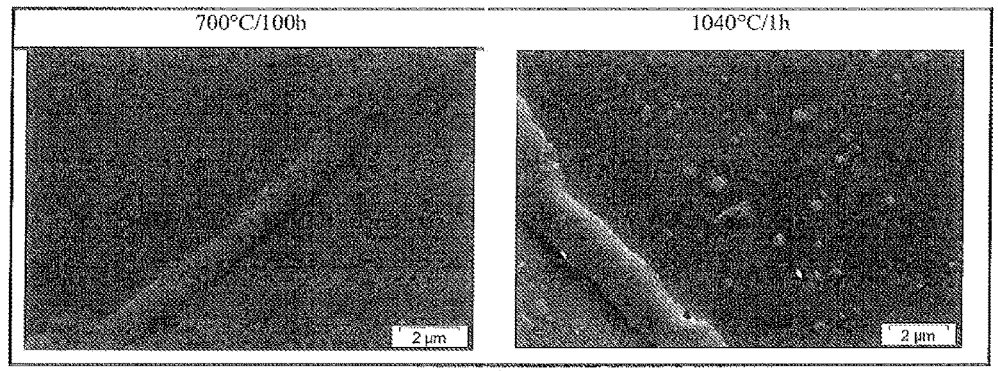
FIG. 10 illustrates the microstructure state after 100 hours of aging at 700° C. and after one hour at 1040°, in accordance with one embodiment of the present invention.

The kinetics of transformation of the carbides $M_7C_3 \rightarrow M_{23}C_6$ change as a function of the temperature. It also controls the secondary precipitation kinetics. FIG. 10 presents the microstructure state after 100 hours of aging at 700° C. and after one hour at 1040° C.

Figure 11:
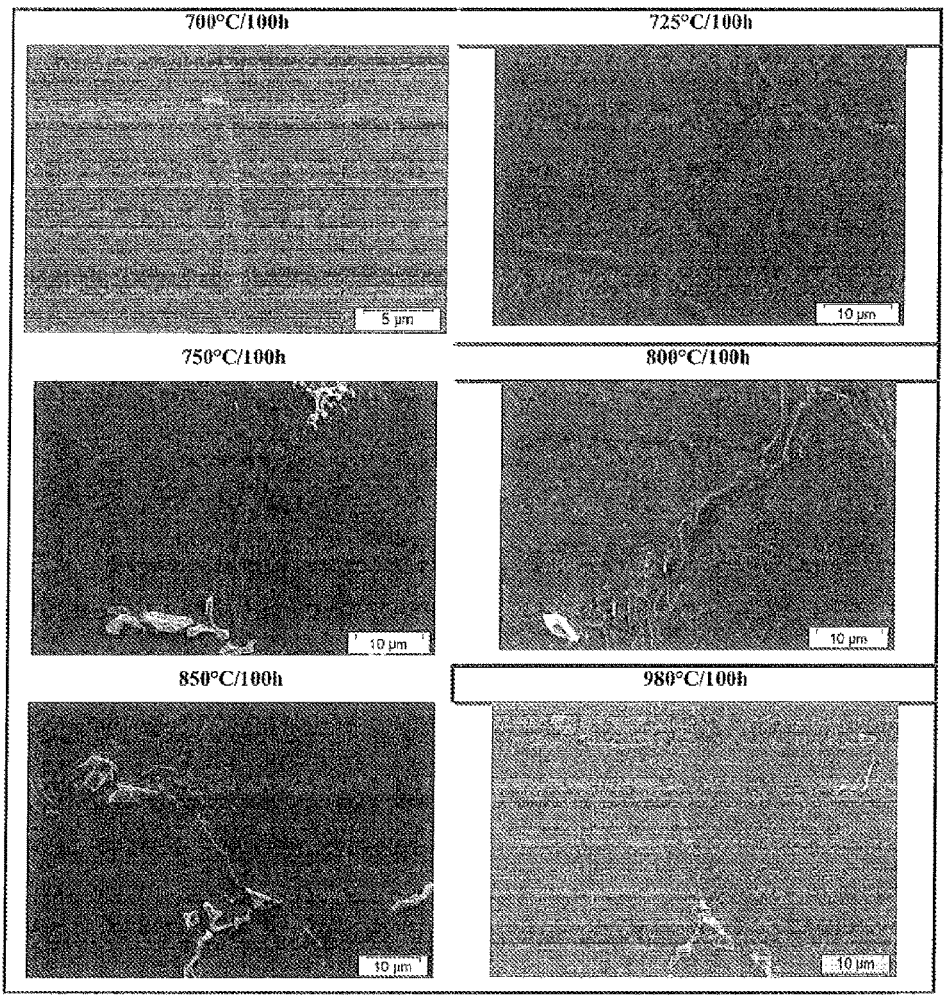
FIG. 11 illustrates the influence, on the size of precipitates, of an aging lasting 100 hours in a range of temperatures extending from 700 to 980°, in accordance with one embodiment of the present invention.

FIG. 11 presents the influence, on the size of precipitates, of an aging lasting 100 hours in a range of temperatures extending from 700 to 980° C. It should be noted that the secondary precipitation zone broadens with the temperature.

Figure 13:
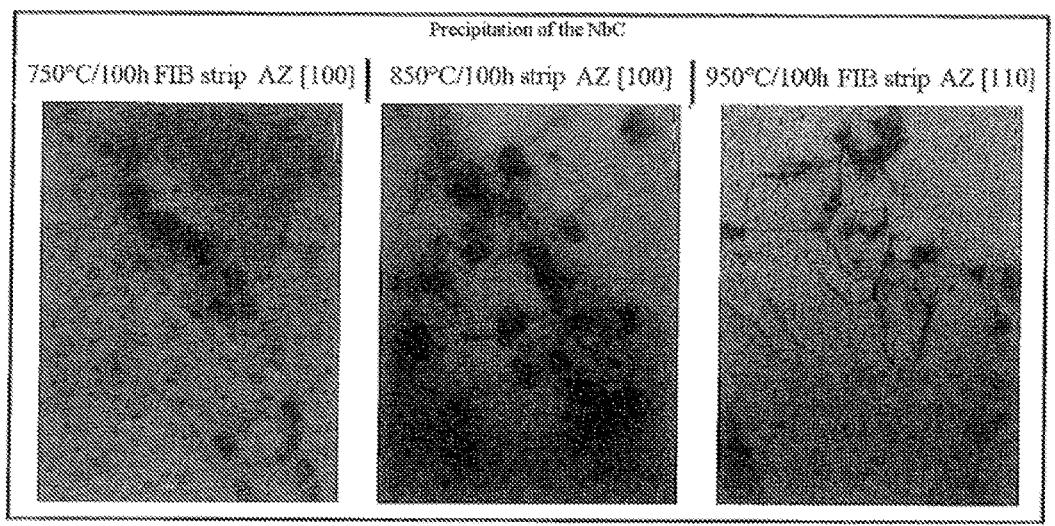
FIG. 13 illustrates the aged states demonstrates that the secondary precipitation consists of two populations of precipitates: NbC, in accordance with one embodiment of the present invention.
Figure 14:
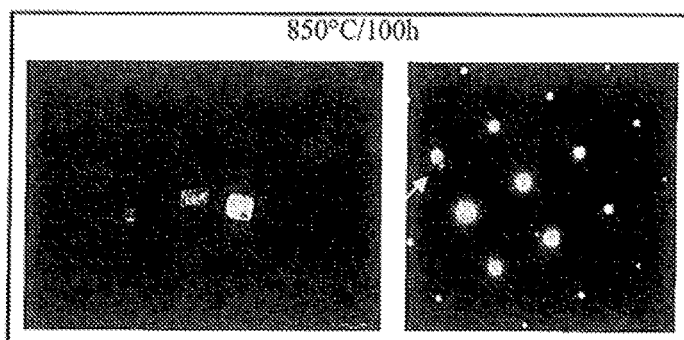
FIG. 14 illustrates the aged states demonstrates that the secondary precipitation consists of two populations of precipitates: NbC, in accordance with one embodiment of the present invention.

The fine analysis of the aged states demonstrates that the secondary precipitation consists of two populations of precipitates: $M_{23}C_6$ (FIG. 12) and NbC (FIGS. 13-14). The $M_{23}C_6$ grows in the austenite in a cube-in-cube orientation ratio. The two phases are of face-centered cubic type. The crystallographic planes of {100} type of the austenite are parallel to the {100} planes of the $M_{23}C_6$. As the unit cell parameter of the $M_{23}C_6$ is approximately three times greater than that of the austenite, the diffraction spots originating from the planes of {200} type of the $M_{23}C_6$ cut into three the distance between two spots originating from the planes of the same type of the austenite. The precipitates of the $M_{23}C_6$ are semi-coherent with the matrix. The presence of dislocations at the matrix/precipitate interface accommodates the elastic distortion due to the parametric discrepancy. The precipitates of $M_{23}C_6$, often in the form of cubes, are typically from 100 to 500 nm.

The second population of precipitates consists of very fine niobium carbides, typically of 50 nm. This precipitation has been observed in the microstructures aged at 700-850° C. for 100 hours and at 980° C. for 1000 hours. Like the carbide $M_{23}C_6$, the NbC precipitates in a cube-in-cube orientation ratio in the austenite (FIG. 14). It is very often observed on dislocation lines.

Figure 15A:
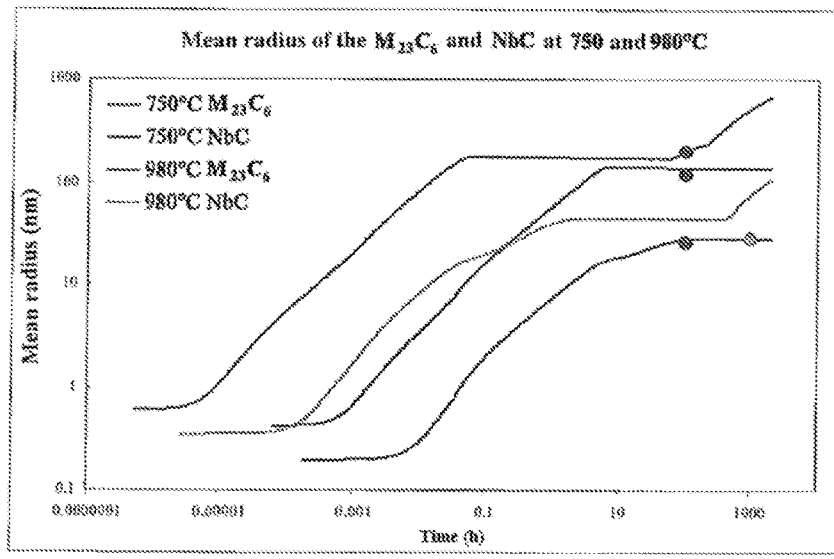
FIGS. 15A and 15B illustrate the change in the mean radius of the precipitates and their fraction over time at 750 and 980° C. as simulated using the Prisma software, in accordance with one embodiment of the present invention.
Figure 15B:
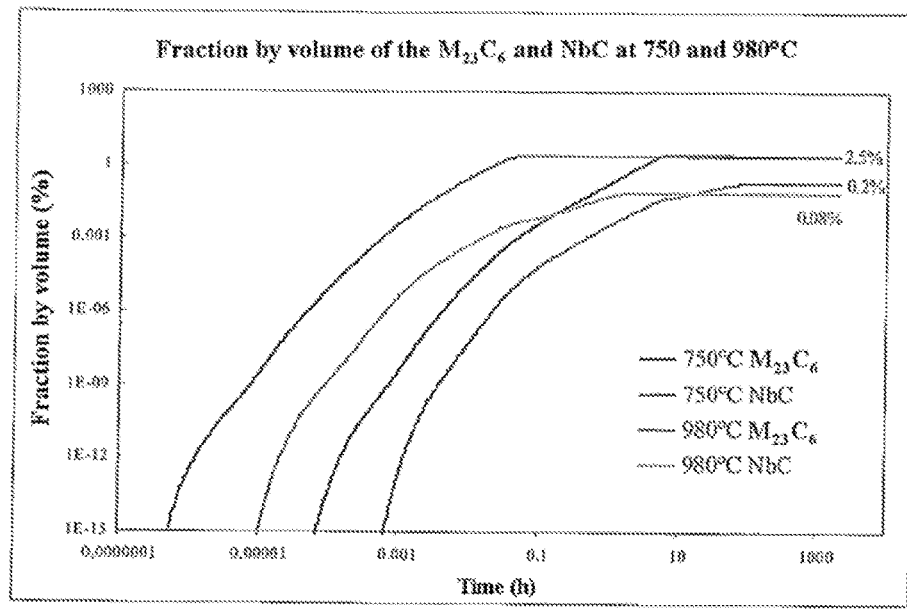

Given that the secondary precipitation consists of two populations of precipitates, the change in the mean radius of these precipitates and their fraction over time at 750 and 980° C. have been simulated using the Prisma software (FIGS. 15A and 15B).

Prisma makes it possible to model the nucleation, the growth and the coalescence of the secondary phases under isothermal conditions, in complex systems. The points on the curves representing the change in the mean radius correspond to the experimental results. It should be noted that the fraction by volume of the $M_{23}C_6$ at 750 and 980° C. is 2.5%, the mean radius of the $M_{23}C_6$ at 980° C. being greater than at 750° C.

Figure 16:
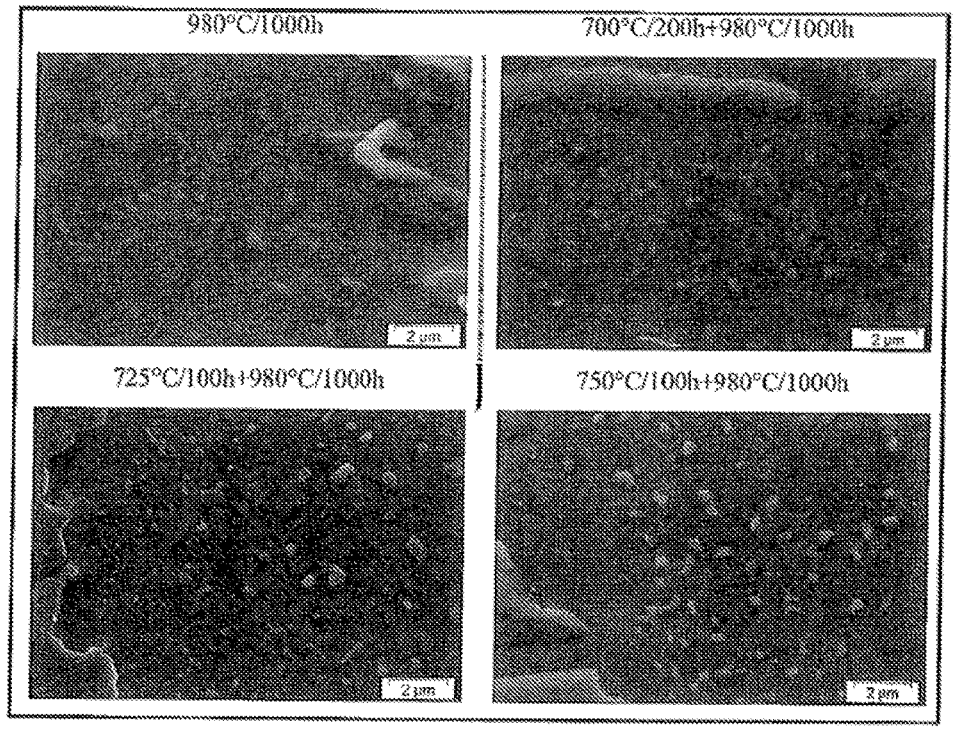
FIG. 16 illustrates a comparison of the microstructures which have been subjected to a pretreatment before the treatment at 980° C. for 1000 h with a microstructure aged at 980° C. for 1000 h without a preliminary pretreatment, in accordance with one embodiment of the present invention.

FIG. 16 presents a comparison of the microstructures which have been subjected to a pretreatment before the treatment at 980° C. for 1000 h with a microstructure aged at 980° C. for 1000 h without a preliminary pretreatment. The density of precipitates is greater in the pretreated microstructures (table 4). In the case of the microstructure having been subjected to a 750° C./100 h+980° C./1000 h treatment, the number of precipitates has increased by 63% with respect to the 980° C./1000 h state. Specifically, an increase in the number of precipitates provides a honing of the microstructure.

Figure 17:
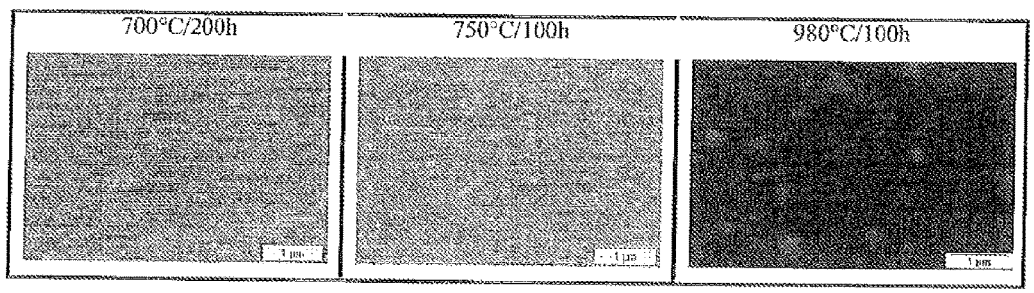
FIG. 17 illustrates three microstructures aged at 700, 750 and 980° C., in accordance with one embodiment of the present invention.

FIG. 17 presents three microstructures aged at 700, 750 and 980° C. The images were taken close to former primary carbides where the density of precipitates is highest. After 100 hours at 980° C., the precipitates are not numerous and, in comparison with the states aged at 700 and 750° C., their size is high. Furthermore, as was shown by X-ray diffraction, after 100 h at 750° C. and 200 h at 700° C., the $M_7C_3 \rightarrow M_{23}C_6$ transformation is not complete. The images of the transmission electron microscope reveal the presence of precipitates of Cr or Nb carbides. These nanometric secondary precipitates must be formed in clusters acting as heterogeneous precipitation sites.

Such a specific microstructure is obtained only if the manufacturing process and the corresponding heat treatment are very well controlled. Such a specific microstructure is illustrated by FIGS. 12 and 13.

Figure 12:
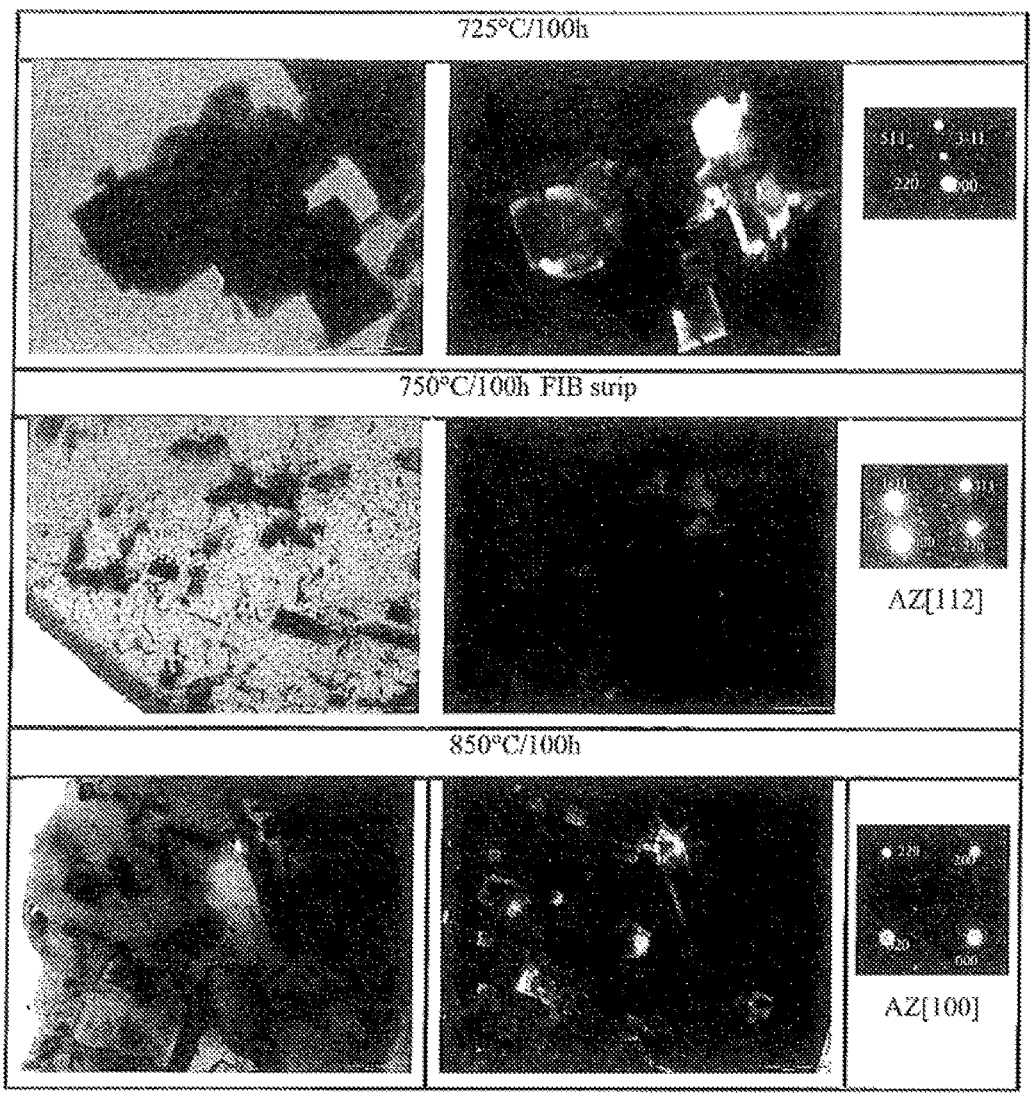
FIG. 12 illustrates the aged states demonstrates that the secondary precipitation consists of two populations of precipitates: $M_{23}C_6$, in accordance with one embodiment of the present invention.

FIG. 12 corresponds to the image obtained by a transmission electron microscope (TEM) of the secondary precipitation of carbide rich in Cr of $M_{23}C_6$ type of a sample of the alloy C after heat treatments at temperatures of 725° C., 750° C. and 850° C. for 100 h. Precipitates of nanometric size are observed.

FIG. 13 corresponds to the image obtained by a transmission electron microscope (TEM) of the secondary precipitation of carbide rich in Nb of MC type of a sample of the alloy C after heat treatments at temperatures of 750° C., 850° C. and 950° C. for 100 h. Precipitates of nanometric size on dislocation lines and clusters are observed.

The presence of nanometric precipitates makes it possible to stabilize the microstructure of the alloys and consequently to improve the creep and the mechanical strength, which will contribute to increasing the lifetime of the tube under the working conditions.

For these reasons, another subject matter of the present invention is a reforming tube comprising an alloy according to the invention which can be used for the production of synthesis gas.

The better creep resistance and the better mechanical strength of the alloy according to the invention are illustrated by FIG. 18.

Figure 18A:
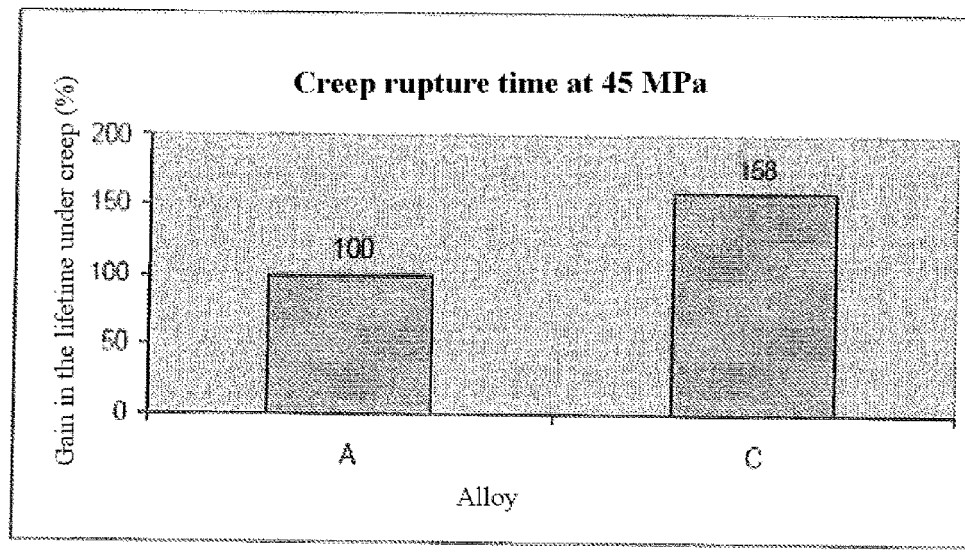
FIGS. 18A and 18B illustrate the creep strength is increased by 158% when a stress of 45 MPa is exerted and by 550% when a stress of 60 MPa is exerted, in accordance with one embodiment of the present invention.
Figure 18B:
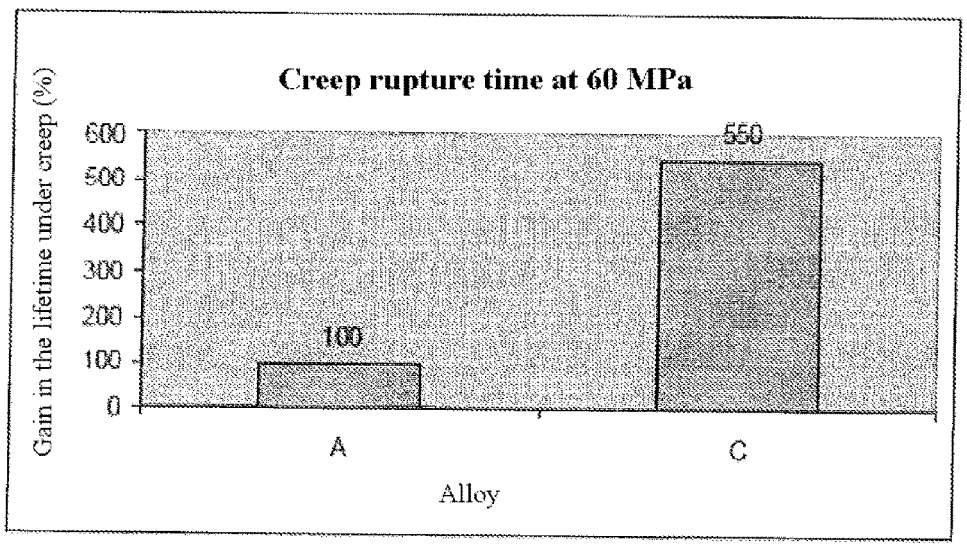

The alloy A corresponds to the alloy C before improvement. This alloy A is available commercially in the cast form with the chemical composition presented by table 3. FIGS. 18A and 18B show that the creep strength is increased by 158% when a stress of 45 MPa is exerted and by 550% when a stress of 60 MPa is exerted.

TABLE 3

Chemical compositions (as weight %) of commercially available alloys of HP type and of the alloy C (commercial) used in this invention.

| Alloy specification | | C | Ni | Cr | Si | Mn | Mo | Nb | Ti | P | S | Fe | Reference |
|---|---|---|---|---|---|---|---|---|---|---|---|---|---|
| HP-Nb | min. | 0.38 | 34 | 24 | 0.50 | 0.50 | | 0.50 | | | | balance | [1] |
| | max. | 0.45 | 37 | 27 | 1.50 | 1.50 | 0.50 | 1.50 | | 0.04 | 0.04 | balance | |
| Centralloy G4852 Micro R | nom. | 0.45 | 35 | 25 | 0.80 | 1.00 | | 1.00 | add. | | | balance | [2] |
| Manaurite XMR | min. | 0.35 | 33 | 23 | 1.00 | 0.50 | | | add. | | | balance | [3] |
| | max. | 0.50 | 38 | 28 | 1.20 | 1.00 | | | | | | | |
| KHR35CT | min. | 0.45 | 33 | 24 | | | | 0.40 | add. | <0.03 | <0.03 | balance | [4] |
| | max. | 0.75 | 37 | 27 | 2.00 | 2.00 | 0.50 | 1.00 | | | | | |
| MTEK 25-35MA | min. | 0.35 | 33 | 23 | | | | 0.50 | | | | | [5] |
| | max. | 0.55 | 37 | 27 | 2.00 | 1.50 | 0.50 | 1.25 | | | | balance | |
| Alloy C | | 0.45 | 34.1 | 25.5 | 0.92 | 0.74 | 0.05 | 0.69 | 0.048 | 0.018 | 0.003 | balance | |

TABLE 4

Mean radius and number of the precipitates in four microstructures aged at 980° C. for 1000 hours, with or without a heat pretreatment.

| Treatment | Mean radius (μm) | Number of precipitates |
|---|---|---|
| 980° C./1000 h | 0.19 | 1233 |
| 700° C./192 + 980° C./1000 h | 0.18 | 1314 ↑6% |
| 725° C./100 h + 980° C./1000 h | 0.18 | 1457 ↑18% |
| 750° C./100 h + 980° C./1000 h | 0.19 | 2008 ↑63% |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the manufacture of an alloy of iron, nickel and chromium, for a tube of reformers, comprising from 22 to 30% by weight of Cr, from 20 to 45% by weight of Ni and from 0.3 to 0.6% by weight of C and exhibiting a microstructure with an austenitic matrix such that:
   i) micrometric primary precipitates in the form of carbides of $M_{23}C_6$ type with M=Fe, Ni or Cr and/or of M(C,N) type with M=Nb or Ti are formed during the solidification of the alloy;
   ii) nanometric secondary precipitates in the form of carbides of $M_{23}C_6$ type with M=Fe, Ni or Cr and of M(C,N) type with M=Nb or Ti are formed during the bringing into service of the tube; and
   iii) an amount of intermetallic precipitates of $Ni_{16}Si_7Nb_6$ type of between 0.1 and 0.3% is formed during the use of the tube,
   the process comprising a heat treatment of said alloy carried out in two stages:
   a) a first stage of heat treatment at temperatures between 700° C. and 800° C. with a stationary phase of 10 h to 100 h, and
   b) a second stage of heat treatment under operating conditions of the furnace of the reforming having as source a source of hydrocarbons and being subjected to a pressure varying between 1 and 4 MPa and a temperature between 900° C. and 1000° C.

2. The process of claim 1, wherein the secondary precipitates form dislocation clusters.

3. The process of claim 1, wherien the primary precipitates are micrometric.

4. The process of claim 1, wherein the secondary precipitates are nanometric.

5. The process of claim 4, wherein the secondary precipitates are between 5 nm and 50 nm.

6. The process of claim 1, wherein the primary precipitates of $M_{23}C_6$ type represents from 3 to 8% of the chemical composition of the alloy and the M(C,N) precipitates represents from 0.5 to 2.5% of the chemical composition of the alloy.

7. The process of claim 1, wherein the secondary precipitates of $M_{23}C_6$ type represents from 1 to 3% of the chemical composition of the alloy and the M(C,N) precipitates represents from 0.1 to 0.5% of the chemical composition of the alloy.

* * * * *